Oct. 7, 1930.  O. A. ROSS  1,777,419
FOCUS AND FINDING APPARATUS FOR MOTION PICTURE CAMERAS
Filed April 23, 1927    3 Sheets-Sheet 2
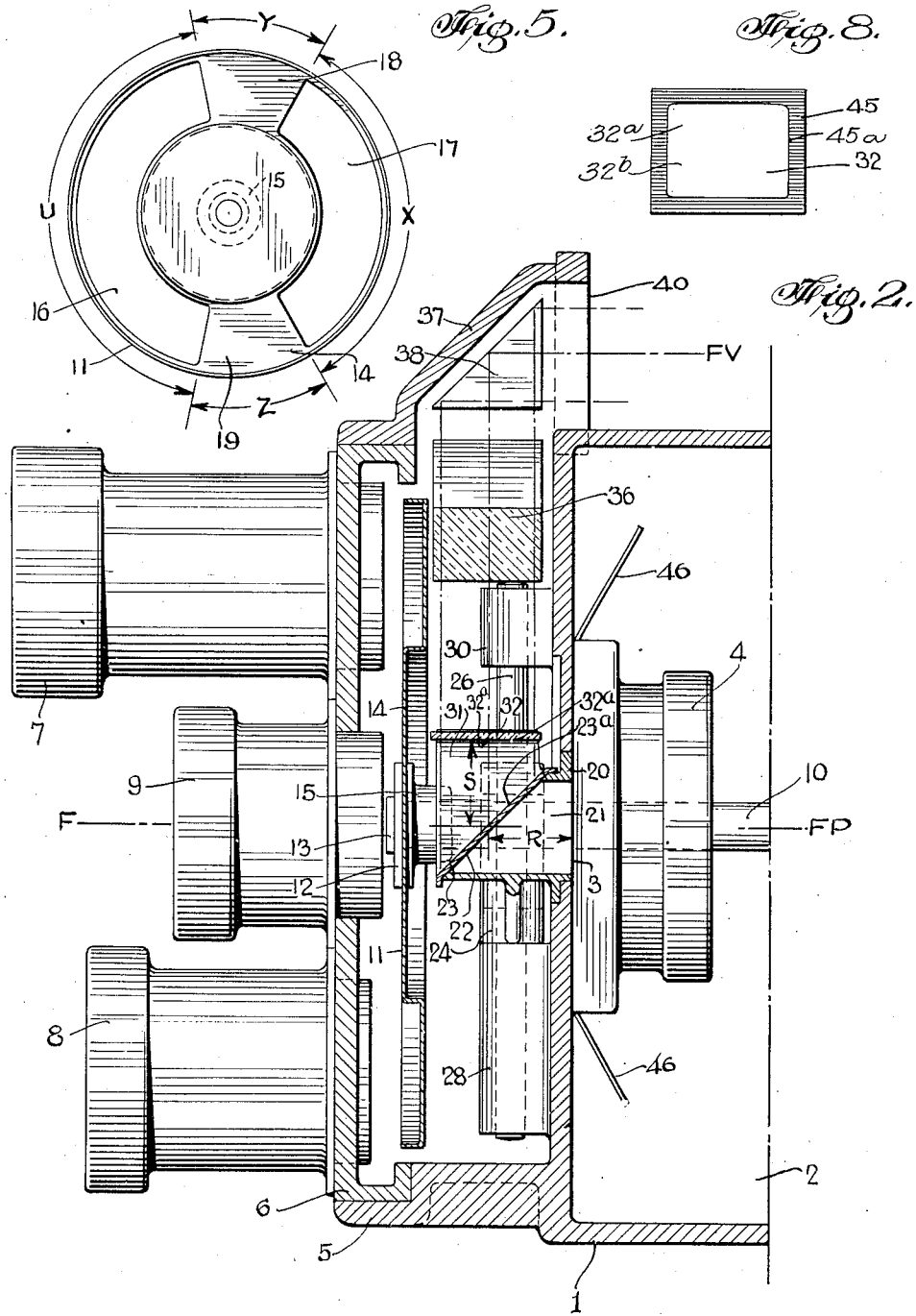
INVENTOR
Oscar A. Ross.

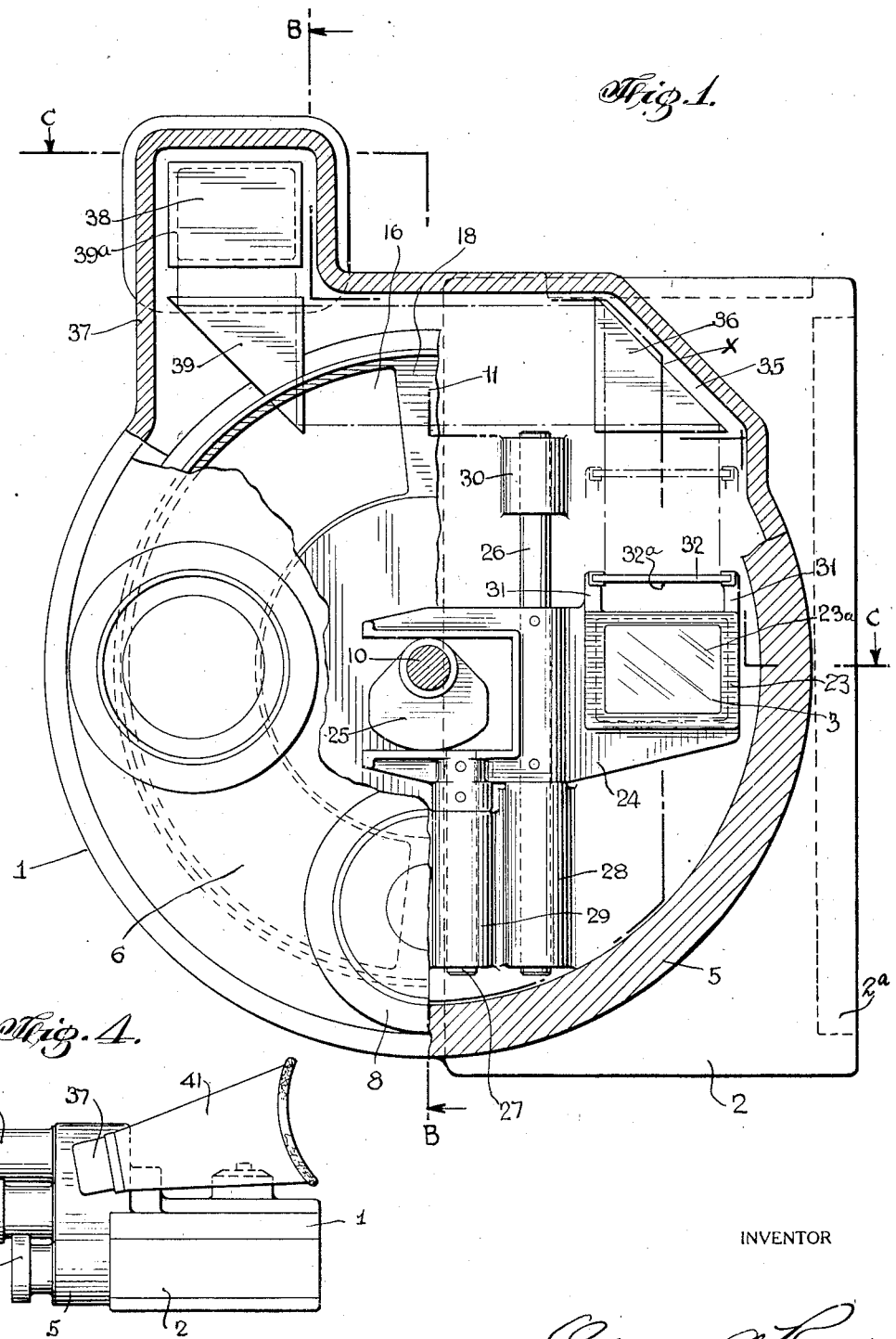

Oct. 7, 1930.                    O. A. ROSS                       1,777,419
             FOCUS AND FINDING APPARATUS FOR MOTION PICTURE CAMERAS
                    Filed April 23, 1927         3 Sheets-Sheet 3
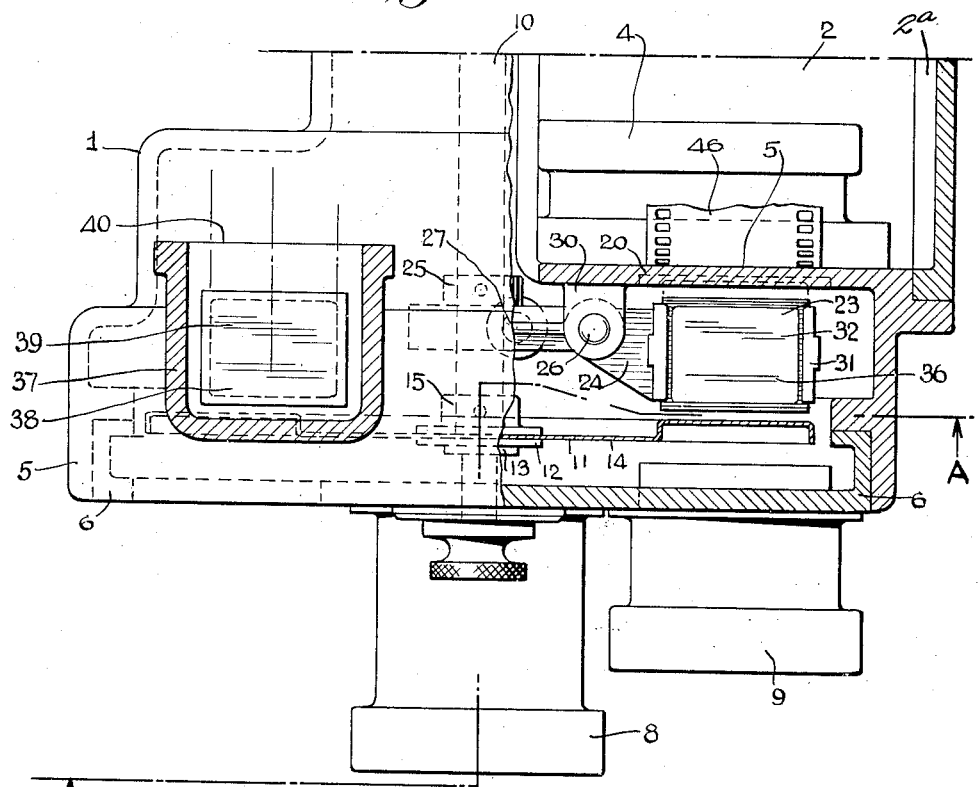
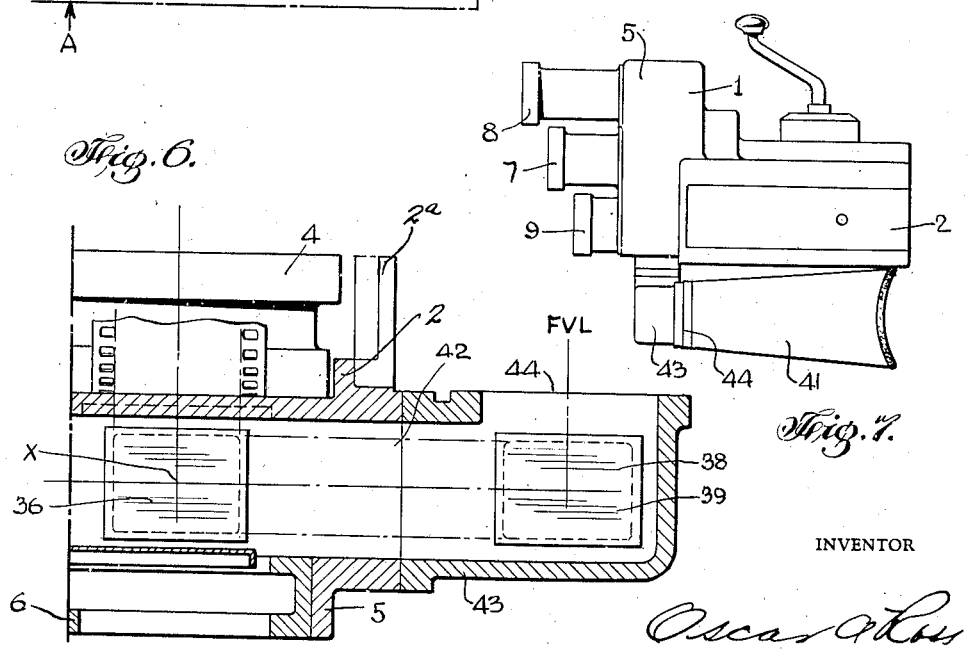
INVENTOR Patented Oct. 7, 1930

1,777,419

UNITED STATES PATENT OFFICE

OSCAR A. ROSS, OF NEW YORK, N. Y.

FOCUS AND FINDING APPARATUS FOR MOTION-PICTURE CAMERAS

Application filed April 23, 1927. Serial No. 186,089.

This invention relates to focusing finders and more particularly to that class of focusing finders employed in connection with motion picture cameras.

Preliminary to photographing a "movie scene on location" it is customary to focus on the "set" by focusing through the "focusing aperture," ordinarily supplied on standard motion picture cameras, thereafter shifting said camera and "swinging the lens" to the "photographing aperture."

If, for any reason, the distance of the point focussed upon should vary during the "shooting of the scene" the adjustment of the lens for proper focus must be estimated by the photographer.

Further, if through "action" the scene is materially "shifted" whereby the axis of focus of the "set" does not register with the axis of focus of the camera lens and it becomes necessary to shift the camera to reestablish registration of focus with the set, such registration must also be estimated by viewing through a finder, the axis of focus of which does not register with the axis of focus of the photographing lens, and whereas motion picture photographers become more or less expert in estimating the aforesaid registration and point of focus, many errors obtain, and, it is therefore customary to employ a number of motion picture cameras in photographing a scene, especially where considerable action obtains, or where the distance between the camera and the "set" may be substantially varied during the "shooting of a scene," or if a high degree of delineation of the "frame" is required, for the purpose of obtaining proper reproduction of the scene on a film.

The prime object of this invention is to overcome the aforesaid difficulties by adding a novel system of focusing and finding to a standard motion picture camera, and comprising, in reality, a motion picture projector combined with a motion picture camera, and wherein the shutter ordinarily employed in a motion picture camera is modified and operated in conjunction with a reciprocating mirror to effect a reproduction of the true image, as it would be viewed at the photographing aperture before the eyes of the photographer, in enlarged and upright form, while the camera is in operation.

The advantage of such an arrangement will at once be apparent, for example:

While a photographer is "shooting a scene" he may also view this scene, as it appears in the photographing aperture of his camera, and, when change of focus, or a shift of the camera is required, it may be accurately made without guessing, estimating or interruption of the camera operation.

In addition to obtaining properly focussed or sharply denoted pictures on the negatives and accurate marginal delineation of the "set" or scene on each "frame" under all conditions of "shooting of a scene," it is also possible to accomplish this result by employing motion picture photographers of ordinary skill, in this manner reducing the cost of the motion picture production.

Other objects and advantages will appear as the description of the invention progresses, and the novel features of the invention will be pointed out in the appended claims.

This invention consists in the novel construction and arrangement of parts hereinafter described, delineated in the accompanying drawings, and particularly pointed out in that portion of the instrument wherein patentable novelty is claimed for certain and peculiar features of the invention, it being understood that, within the scope of what hereinbefore thus is claimed, divers changes in the form, proportions, size and minor details of the system may be made without departing from the spirit of, or sacrificing any of the details of the invention.

In describing the invention in detail, reference is had to the accompanying drawings, wherein I have illustrated embodiments of my invention, and wherein like characters of reference designate corresponding parts through the several views, and in which:—

Figure 1, is a part sectional, part elevational front view of a standard motion picture camera, in which applicant's invention has been embodied and is taken on line A—A of Fig. 3, and, Fig. 2, is a part sectional part elevated side view of the same camera, taken on line B—B of Fig. 1, and, Fig. 3, is a part sectional part elevated top view of the same camera, taken on line at C—C of Fig. 1, and, Fig. 4, is a reduced elevated top view of a camera, embodying applicant's invention, and to which a magnifying view finder has also been attached, and, Fig. 5, is a plan view of the modified form of shutter forming part of this invention, and, Fig. 6, is a modified arrangement of prisms to permit viewing of the photographed image at the left side of a camera, and, Fig. 7, is a reduced size top view of a camera, in which this invention is embodied and showing the viewing member attached to the left side of the camera.

Referring to Fig. 8, the image depicting member 32 comprises transparent member 32$^a$, having etched surface 32$^b$ surrounded by the mask 45 having frame margin 45$^a$.

Referring to Figs. 1, 2 and 3, camera 1, of standard make, as for example, Mitchell, or Bell and Howell, comprises in part film advancing or shuttle mechanism housing 2, having door 2$^a$, photographing aperture 3, and shuttle mechanism 4, and turret head 5, having turret 6, fitted with lenses 7, 8 and 9.

To the shutter shaft 10, of well known structure and function is secured by washer 12 and screw 13 the modified shutter 11, comprising shutter blade 14, secured to hub 15, and having photographing opening 16, focus and view finding opening 17, and opaque sections 18 and 19.

Suitably secured in the photographing aperture 3, is gate member 20, having rectangular light passageway 21 of substantially the maximum dimensions of a "frame" the left hand opening 22 of which is diagonally formed and adapted to be closed by reflecting member 23, secured to shuttle 24, adapted to be reciprocated by cam 25, and rigidly secured to, and guided by shafts 26 and 27, operating in bearings 28, 29 and 30.

Also part of shuttle 24 are extensions 31—31 supporting the image receiving member or ground glass 32 preferably supporting a mask as 45, (see Fig. 8), the distance S from the photographic axis F—FP being substantially equal to the distance R from said axis to the image receiving surface 32$^a$, of member 32.

Turret housing 5, is modified to include cavity 35, in which prism 36 is suitably mounted and is further modified to include prism housing 37, in which prisms 38 and 39 are suitably mounted and having opening 40 to which a magnifying view finder as 41 (Fig. 4) may be attached.

Referring to Fig. 6, illustrating a modified location of the viewing aperture of this invention, the prism, as 36, has been revolved through an angle of one hundred and eighty degrees on its vertical axis, and the cavity 35 has been extended to the right and caused to terminate in opening 42, to which detachable prism housing 43 is suitably attached, and in which are suitably mounted prisms 38 and 39, a magnifying view finder as 41 (Fig. 7) being suitably secured to opening 44 of housing 43.

Referring to Fig. 8, showing the image receiving, or depicting member 32 more in detail, said member comprises the transparent member 32$^a$ having an etched or other form of image depicting surface 32$^b$, and to which is secured the mask, or opaque frame 45, the inner frame line 45$^a$ of which is substantially of the dimensions of a single motion picture frame.

The operation of applicant's novel invention is as follows:—

With the parts as shown, the photographing aperture 3, is closed by the reflecting member 23, seating on opening 22 of gate 20, and the film 46 is being advanced one "frame" by the shuttle mechanism 4, and the focus and view finding opening 17 in shutter 11, is permitting the image rays projected by lens 9, to pass through said opening on to the mirrored surface 23$^a$ of the reflecting member 23, whereupon said rays are reflected at an angle substantially ninety degrees upwardly and partly along the axis F—FV until they impinge on the lower or image ray receiving surface 32$^a$, of the image receiving member 32. Member 32, is preferably supplied with a suitable mask 45 (Fig. 8) whereby the delineated area of image will be substantially that established by the photographing aperture 3 (one motion picture frame substantially three quarters by one inch in dimension).

The image appearing on the surface 32$^a$ of receiving member 32, is obliquely reflected by prism 36 to prism 39 along axis F—FV and thence again reflected to prism 38 where it may be viewed in inverted form as shown by the dotted "frame" outline 39$^a$.

By appending a magnifying view finder as 41 to opening 40, the inverted "frame" 39$^a$ is reverted to normal position and the "frame" and image thereon substantially enlarged, whereby the scene may be not only sharply focussed, but also accurately delineated as to frame margin or limits by the motion picture photographer, who may be viewing the same through said magnifying view finder.

If shutter 11 is now revolved until the focus and view finder opening 17 registers with the light beam and the shuttle 24 has acted to cut off the image rays from lens 9, and the opaque section 18 covers the photographing aperture 3, the cam 25, raises shuttle 24, including the reflecting member 23 and image receiving member 32 to the dotted position shown, in this manner causing member 23 to uncover opening 22, whereby, as the photographing opening 16 of shutter 11 uncovers the photographing aperture, the image rays from lens 9 will pass along axis F—FP and will become photographically impressed on a frame of the film 46 in a well known manner and for a well known purpose.

As shutter 11 further revolves and opaque section 19 covers the photographing aperture, the cam 25 lowers shuttle 24, whereby the reflecting and refracting member 23 again covers opening 22, and as the focusing and finding opening 17 again registers with the light beam with member 23 lowered, the image rays from lens 9 are again reflected along axis F—FP to the magnifying view finder 41, where it may again be viewed by the motion picture photographer, who may be operating the camera as 1.

It is obvious that due to the rapidity with which the image is transferred alternatively between the photographing aperture and the viewing aperture a substantially continuous image will appear in said last named aperture much in the same manner as a motion picture is produced on a screen in a motion picture theater.

During the period, which said reflecting member covers opening 22, the film 46 is being advanced one frame in a well known manner and for a well known purpose.

Whereas in Figs. 1, 2 and 3, the view finding axis is along line F—FP to the right, or cranking side of the camera, and ideal for motor cranking, this axis may be shifted to the left side of said camera as shown by Fig. 6, the axis running from F to X on prism 36 and thence to F—VL to opening 44 of housing 43 and which is attached to the left side of camera.

If desired the member 23, may be modified and secured to the shuttle, ordinarily employed for film advancement and forming part of the mechanism unit as 4, however as the "dwell period" of this shuttle on extreme movements is substantially small, approximately thirty degrees, sufficient light for proper illumination of image projected by the lens, as 9, to the prism 39 or magnifying view finder 41, may not obtain, and more care must be exercised in focusing and establishing "frame" delineation.

It will be obvious that the reflecting member 23, may be hinged at its upper edge, and the lower edge connected to a link, operated by the shuttle 24.

It is further obvious that whereas the reflecting member 23 is diagonally arranged to project the rays upwardly, said member may be diagonally arranged whereby it will project said rays sidewardly, to the right (similarly to Fig. 6) and whereupon the opening 22, in place of facing diagonally upward will also face diagonally sidewardly. Receiving member 32 will also be revolved on the photographic axis of lens 9 through an angle of ninety degrees (clockwise on Fig. 1) and arranged between the reflecting member, as 23, and a prism, as 36, only one of which will be required between the receiving member 32 and a magnifying view finder as 41.

The magnifying view finder is preferably of a type as disclosed in Patent No. 1,584,186 issued to George A. Mitchell on May 11th, 1926.

From the foregoing, it will be seen, that the applicant's novel structure comprises in reality an instrument which functions simultaneously as a motion picture camera and a motion picture projector, the camera portion photographing the image projected by the lens onto the film, and the motion picture projector portion projecting the same image into the view of a motion picture photographer when his sight is directed into a suitable finder as 41, attached to applicant's novel structure. Whereas these operations are distinct and separate, they occur with such rapidity, that the view appearing in finder 41, appears as a continuous one, much in the same manner as a motion picture is projected by a motion picture projector and viewed by the audience in a motion picture theater.

What I claim is:—

1. In combination; a motion picture camera, an objective supported thereby arranged to project a beam of image rays onto a film therein, a view finder attached to the camera arranged to receive the beam projected by the objective, a reciprocating light deflecting member supported by the camera for intermittently intercepting the beam between the objective and the film arranged to periodically deflect the beam into the view finder, a shutter positioned to travel in the path of the beam having opaque portions each arranged to intercept the beam between the objective and the film during each reciprocating movement of the reciprocating member but permit the beam to pass therethrough during the stationary periods of the member, and means for operating the reciprocating member and the shutter in synchronism whereby the beam is alternately projected into the view finder and onto the film during the stationary periods of the reciprocating member and the opaque shutter portions will intercept the beam while the reciprocating member is in a state of reciprocation from one position to the other.

2. In combination; a motion picture camera, an objective supported thereby arranged to project a beam of image rays onto a motion picture film therein, a view finder attached to the camera arranged to receive the image beam projected by the objective, a reciprocating reflecting member arranged in one stationary position to intercept the beam between the objective and the film and simultaneously deflect the beam into the view finder and in another stationary position to be removed from the path thereof whereby the film will be exposed thereto, an intercepting member supported by the camera positioned between the objective and the reciprocating member for intercepting the beam therebetween during the movement of the reciprocating member from one position to the other and not so intercepting the beam during the stationary periods thereof, and means for operating the reciprocating member and the intercepting member in synchronism whereby the beam will be intercepted by the intercepting member during the periods the reciprocating member is in a state of reciprocation and will not be so intercepted while the member is in a stationary position.

3. In combination; a motion picture camera, an objective supported thereby arranged to project a beam of image rays onto a motion picture film therein, a view finder arranged to be attached to the camera whereby the beam projected by the objective may be deflected thereinto, a reciprocating light-deflecting member reciprocably supported by the camera arranged in one position to intercept the beam between the objective and the film and simultaneously deflect the beam into the finder, and in another position will be removed from the path thereof whereby the image deflected thereby will be photographically impressed on the film, means for moving the reciprocating member from one position to the other, an intercepting member supported by the camera positioned between the objective and the film for intercepting the beam therebetween during the reciprocal movement of the reciprocating member and not so intercepting the beam during the stationary periods thereof, and means for operating the reciprocating member and the intercepting member in synchronism whereby the beam is intercepted by the intercepting member during the periods the reciprocating member is in a state of reciprocation and will not be so intercepted while the reciprocating member is in a stationary position.

4. In combination; a motion picture camera, an objective supported thereby arranged to project a beam of image rays onto a motion picture film therein, a view finder attached to the camera arranged to receive the beam projected by the objective, a reciprocating light-deflecting member reciprocably supported by the camera arranged in one position to intercept the path of the beam between the objective and the film and simultaneously deflect the beam into the finder, and in another position to be removed from the path whereby the image depicted thereby will be photographically impressed on the film, means supported by the camera for moving the reciprocating member from one position to the other producing comparatively short movement intervals as compared to the stationary intervals thereof, an intercepting member supported by the camera positioned between the objective and the reciprocating member for intercepting the beam between the objective and the film during the short reciprocal movements of the reciprocating member and not so intercepting the beam during the longer stationary periods thereof, and means for operating the reciprocating movement means and the intercepting member in synchronism whereby the beam will be intercepted by the intercepting member during the periods the reciprocating member is in a state of reciprocal movement and will not so intercept when the member is in a stationary position.

5. In combination, a motion picture camera having a housing, an objective and a view finder arranged to be supported thereby, a film advancing mechanism supported therein arranged to intermittently position a film in the path of the beam of image rays projected by the objective whereby the image may be photographically impressed thereon, an aperture member supported by the housing having an orifice through which the beam passes when the image produced thereby is photographically impressed on the film, a movable light deflecting member arranged in one position to light proofingly close the orifice and deflect the beam into the view finder and in another position to be removed from the path between the objective and the film whereby the image will be photographically impressed on the film by the rays passing through the orifice, and means for operating the light deflecting member and the film advancing mechanism in synchronism whereby the light deflecting member will be remotely positioned from the photographing beam while the film is maintained stationary by the film advancing mechanism and light proofingly covers the orifice and deflects the beam into the view finder while the film is being advanced thereby.

6. In combination, a motion picture camera, an objective supported thereby arranged to project a light beam onto a film therein, a view finder movable light deflecting means supported by the camera arranged in one position to intercept the beam projected by the objective whereby it will be deflected into the view finder and in another position to be removed from the beam whereby the image produced thereby will be photographically impressed on the film, a shutter supported by the camera positioned to travel in the path of the beam between the objective and the film, a photographing orifice in the shutter arranged to permit the beam to pass from the objective to the film during the period the light deflecting means is removed from the beam, a view finding orifice in the shutter arranged to permit the beam to pass from the objective to the view finder while the light deflecting means intercepts the beam, opaque portions formed on the shutter positioned alternately with the orifices for intercepting the beam between the objective and the film during the periods of movement of the light deflecting means, and means for operating the shutter and the light deflecting means in synchronism whereby the photographing orifice registers with the beam during the periods the light deflecting means is removed therefrom, the view finding orifice registers with the beam during the periods the light deflecting means intercepts the beam and the opaque portions register with the beam during the periods the light deflecting means is in a state of movement from one position to the other.

7. In combination, a motion picture camera, an objective supported thereby arranged to project a light beam onto a film positioned therein, a view finder movable light deflecting means supported by the camera arranged in one position to intercept the beam projected by the objective whereby it will be deflected into the view finder and in another position to be removed from the beam whereby the image produced thereby will be photographically impressed on the film, a single shutter supported by the camera arranged to travel in the path of the beam between the objective and the film, a photographing orifice in the shutter arranged to permit the beam to pass from the objective to the film during the period the light deflecting means is removed from the beam, a view finding orifice in the shutter arranged to permit the beam to pass from the objective to the view finder while the light deflecting means intercepts the beam, opaque portions formed on the shutter positioned alternately with the orifices for intercepting the beam between the objective and the film during the periods of movement of the light deflecting means, and means for operating the shutter and the light deflecting means in synchronism whereby the photographing orifice registers with the beam during the periods the light deflecting means is removed therefrom, the view finding orifice registers with the beam during the periods the light deflecting means intercepts the beam, and the opaque portions register with the beam during the periods the light deflecting means is in a state of movement from one position to the other.

8. In combination, a motion picture camera, an objective and a view finder supported thereby, a film advancing mechanism supported therein arranged to intermittently position a film whereby the beam of image rays projected by the objective will be photographically impressed thereon, a movable light deflecting member supported by the camera arranged in one stationary position to intercept the beam projected by the objective whereby it will be deflected into the view finder and in another stationary position to be removed from the path of the beam whereby the image produced thereby will be photographically impressed on the film, light intercepting means supported by the camera positioned between the objective and the film arranged to intercept the beam during the period the light deflecting member is in a state of movement from one position to another and not so intercept when the light deflecting member is in alternate stationary positions, and means for operating the film advancing mechanism, the light deflecting member and the intercepting means in synchronism whereby during one period of movement the light intercepting means will permit the beam to pass from the objective to the film while the film advancing mechanism is stationary and the light deflecting member is stationarily positioned remote from the beam, at a subsequent period of movement the beam is intercepted while the light deflecting member is being moved into the path of the beam, at a further subsequent period of movement the beam is permitted to pass from the objective to the view finder while the light deflecting member is stationarily positioned in the path of the beam and the film is being advanced by the film advancing mechanism and the cycle is completed by the light intercepting means again intercepting the beam while the light deflecting member is being removed from the path of the beam to the stationary position remote therefrom.

9. In combination, a motion picture camera having an objective and a view finder supported thereby, a film advancing mechanism supported therein arranged to intermittently position the film in the path of the beam of image rays projected by the objective whereby the image depicted thereby will be photographically impressed thereon, an aperture member supported by the camera positioned between the objective and the film having a light passageway formed therein one end of which is arranged adjacent the film and the other end of which is arranged to receive the light beam projected by the objective, a movable light deflecting member supported by the camera arranged in one position to light proofingly close the receiving end of the light passageway and simultaneously deflect the beam into the view finder and in another position be removed from the beam whereby the light passageway will be open and the image depicted by the beam will be photographically impressed on the film, and means for operating the light deflecting member and the film advancing mechanism in synchronism whereby the light deflecting member will be remotely stationed from the beam while the film is maintained stationary by the film advancing mechanism, and light proofingly closes the light passageway and deflects the beam into the view finder while the film is being advanced by the film advancing mechanism.

10. In combination, a motion picture camera, an objective supported thereby arranged to project a beam of light rays onto a film therein, a view finder supported by the camera arranged to receive the beam projected by the objective, a movable light deflecting member supported by the camera arranged in one position to intercept and deflect the beam into the view finder and in another position to be removed from the path of the beam whereby the image produced thereby will be photographically impressed onto the film, a rotating disk shutter supported by the camera arranged to travel in the path of the beam between the objective and the film, a photographing orifice therein arranged to permit the beam to pass from the objective to the film when the light deflecting member is removed remote therefrom, a view finding orifice therein arranged to permit the beam to pass to the view finder when the light deflecting member is positioned in the path of the beam, opaque portions formed thereon positioned alternately circumferentially between the orifices arranged to consecutively intercept the beam during the periods the light deflecting member is in movement from one position to the other, and means for operating the light deflecting member and the shutter in synchronism whereby the light deflecting member will be remotely positioned from the light beam while the photographing orifice registers with the beam, the light deflecting member will deflect the beam into the view finder while the view finding orifice registers therewith, and the opaque portions will intercept the beam while the light deflecting member is in a state of movement from one position to the other.

11. In combination, a motion picture camera, an objective supported thereby arranged to project a beam of light rays on a film supported therein, a view finder supported by the camera arranged to receive the image rays projected by the objective, an aperture member supported by the camera and positioned between the objective and the film having an orifice through which the beam is restrained to pass in reaching the film, a shuttle member reciprocatedly supported by the camera arranged in one position to light proofingly cover the orifice whereby the beam between the objective and the film is intercepted and in another position will be removed from the path of the beam, a reflecting mirror supported by the member arranged to reflect the beam into the view finder when the orifice is covered thereby, a light intercepting member supported by the camera arranged to travel in the path of the beam between the objective and the film formed to permit the beam to pass therethrough during each stationary period of the shuttle member and intercept the beam while the member is in reciprocal movement from one position to another, and means for operating the shuttle member and the light intercepting member in synchronism whereby the shuttle member alternately exposes the film and the view finder to the beam during the periods the light intercepting member permits the passage thereof therethrough, and the beam is intercepted alternately with the exposures during the periods the shuttle member is in a state of reciprocal movement from one position to the other.

12. In combination, a motion picture camera, an objective supported thereby arranged to photographically impress a beam of light rays onto a film supported therein, a view finder supported by the camera arranged to receive the beam projected by the objective, a light deflecting member supported by the camera arranged in one position to intercept and deflect the beam into the view finder and in another position to be removed from the path of the beam whereby the rays will be photographically impressed on the film, an image depicting member supported by the light deflecting member arranged to be moved therewith for depicting the image projected by the objective thereon of the same dimensions, sharpness and field as will be photographically impressed on the film, a light intercepting member supported by the camera arranged to travel in the path of the beam between the objective and the film formed to permit the beam to pass therethrough during the stationary periods of the light deflecting member and intercept the beam while the member is in a state of movement from one position to another, and means for operating the light deflecting member and the light intercepting member in synchronism whereby the light deflecting member alternately exposes the film and the view finder to the beam during the periods the light intercepting member permits the passage thereof therethrough and the beam is intercepted alternately with the exposures during the periods of light deflecting member is in a state of movement from one position to the other.

13. In combination, a motion picture camera, an objective supported thereby arranged to project a beam of image rays onto a film supported therein, an aperture member supported by the camera positioned between the objective and the film and adjacent the latter for producing a predetermined delineation of the image photographically impressed on the film, a view finder supported by the camera arranged to receive the beam projected by the objective, a light deflecting member supported by the camera arranged in one position to intercept and deflect the beam projected by the objective into the view finder and in another position to be removed from the path of the beam whereby the image produced thereby will be photographically impressed on the film with a delineation of margin prescribed by the aperture member, an image depicting member positioned in the path of the view finder beam between the light deflecting member and the viewing end of the finder for depicting an image of the same sharpness and character as will be photographically impressed on the film, a mask member supported by the image depicting member arranged to produce the same delineation of margin on the image projected to the viewing end of the finder as is produced by the aperture member, a light intercepting member supported by the camera arranged to travel in the path of the beam between the objective and the film formed to permit the beam to pass therethrough during the stationary periods of the light deflecting member and intercept the beam while the member is in a state of movement from one position to the other, and means for operating the light deflecting member and the light intercepting member in synchronism whereby the light deflecting member alternately exposes the film and the view finder to the beam during the periods the light intercepting member permits the passage thereof therethrough and the beam is intercepted alternately with the exposures during the periods the light deflecting member is in a state of movement from one position to another.

14. In combination, a motion picture camera, an objective supported thereby arranged to project a beam of image rays onto a film supported therein, a view finder supported by the camera arranged to receive the beam projected by the objective, a light deflecting member supported by the camera arranged in one position to intercept and deflect the beam projected by the objective into the view finder and in another position to be removed from the path of the beam whereby the image produced thereby will be photographically impressed on the film, a rotating shutter supported by the camera positioned to travel in the path of the beam between the objective and the film, a photographing orifice therein arranged to permit the beam to pass therethrough to the film during the period the light deflecting member is in the position remote therefrom, a view finding orifice therein arranged to permit the beam to pass therethrough to the light deflecting member and thence to the view finder when the light deflecting member intercepts the beam, the view finding orifice having a shorter exposure period than the photographing orifice, opaque portions formed on the shutter arranged alternately circumferentially with the orifices for intercepting the beam during the periods the light deflecting member is in a state of movement from one position to another, and means for operating the light deflecting member and the shutter in synchronism whereby the light deflecting member will be positioned remotely from the beam while the photographing orifice registers with the beam, the light deflecting member will intercept and deflect the beam into the view finder while the view finding orifice registers therewith, and the opaque portions will intercept the beam while the light deflecting member is in a state of movement from one position to the other.

15. In combination, a motion picture camera, an objective supported thereby arranged to project a beam of image rays onto a film supported therein, a view finder supported by the camera arranged to receive the beam projected by the objective, a light deflecting member supported by the camera arranged in one position to intercept and deflect the beam projected by the objective into the finder and in another position to be removed from the path of the beam whereby the image depicted thereby will be photographically impressed on the film, a rotating shutter supported by the camera positioned to travel in the path of the beam between the objective and the film, a photographing orifice therein arranged to permit the beam to pass therethrough to the film during the period the light deflecting member is in the position remote therefrom, a view finding orifice therein arranged to permit the beam to pass therethrough to the light deflecting member and thence to the view finder when the light deflecting member intercepts the beam, opaque portions formed on the shutter alternately circumferentially with the orifices positioned to travel in the path of the beam for intercepting the beam during the periods the light deflecting member is in a state of movement from one position to the other, the opaque portions having short periods of travel in the beam as compared to the periods of travel of the photographing and view finding orifices therein, and means for operating the light deflecting member and the shutter in synchronism whereby the light member will be positioned remotely from the beam while the photographing orifice registers with the beam, the light deflecting member will be positioned to intercept and deflect the beam into the view finder while the view finding orifice registers with the beam, and the opaque portions will intercept the beam while the light deflecting member is in a state of movement from one position to the other.

In testimony whereof, he has signed his name to this specification this 22nd day of April 1927.

OSCAR A. ROSS.